（12）United States Patent
Chen et al.

(10) Patent No.: US 10,491,346 B2
(45) Date of Patent: *Nov. 26, 2019

(54) MULTI-ANTENNA SYSTEM AND PRECODING METHOD THEREOF

(71) Applicant: INDUSTRIAL TECHNOLOGY RESEARCH INSTITUTE, Hsinchu (TW)

(72) Inventors: Jia-Ming Chen, Taipei (TW); Jiun-You Lai, Zhudong Township, Hsinchu County (TW); Ming-Che Lin, Taichung (TW); Jen-Yuan Hsu, Jincheng Township, Kinmen County (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 70 days.

This patent is subject to a terminal disclaimer.

(21) Appl. No.: 15/857,052

(22) Filed: Dec. 28, 2017

(65) Prior Publication Data

US 2019/0181994 A1 Jun. 13, 2019

(30) Foreign Application Priority Data

Dec. 12, 2017 (TW) .............................. 106143618 A

(51) Int. Cl.
*H04L 5/00* (2006.01)
*H04B 7/06* (2006.01)
(Continued)

(52) U.S. Cl.
CPC .......... *H04L 5/0032* (2013.01); *H04B 7/024* (2013.01); *H04B 7/0456* (2013.01);
(Continued)

(58) Field of Classification Search
None
See application file for complete search history.

(56) References Cited

U.S. PATENT DOCUMENTS 8,009,660 B2   8/2011   Li et al.
8,041,393 B2   10/2011  Carter et al.
(Continued)

FOREIGN PATENT DOCUMENTS

CN   107005320 A   8/2017
EP   2721886 B1    5/2017
(Continued)

OTHER PUBLICATIONS

Hamed et al., "Real-time Distributed MIMO Systems," Sigcomm '16, Aug. 22-26, 2016, pp. 412-425.
(Continued)

*Primary Examiner* — Mohamed A Kamara
*Assistant Examiner* — Saad Khawar
(74) *Attorney, Agent, or Firm* — Muncy, Geissler, Olds & Lowe, P.C.

(57) ABSTRACT

A precoding method in a multi-antenna system includes the following steps. A reference device transmits a first reference signal to base station antennas. A base station calculates uplink channel information and transmits it to a coordination server. The base station transmits a second reference signal to the reference device. The reference device calculates downlink channel information and transmits it to the coordination server. The coordination server performs the following steps: calculate carrier frequency offsets (CFO) between base stations according to the uplink channel information; calculate channel calibration coefficients according to the CFO, the uplink channel information, and the downlink channel information; calculate a first downlink channel at a first time point according to a user equipment's first uplink channel and the channel calibration coefficients; use a prediction function to predict a second downlink channel at a second time point; generate a precoder according to the second downlink channel.

20 Claims, 5 Drawing Sheets

(51) Int. Cl.
*H04W 72/04* (2009.01)
*H04B 7/024* (2017.01)
*H04B 7/0456* (2017.01)

(52) U.S. Cl.
CPC ......... *H04B 7/0678* (2013.01); *H04L 5/0048* (2013.01); *H04W 72/0413* (2013.01); *H04W 72/0466* (2013.01); *H04W 72/046* (2013.01)

(56) References Cited

U.S. PATENT DOCUMENTS

| | | | |
|---|---|---|---|
| 8,432,891 | B2 | 4/2013 | Li et al. |
| 8,625,713 | B2 | 1/2014 | Li et al. |
| 8,995,410 | B2 | 3/2015 | Balan et al. |
| 9,106,276 | B2 | 8/2015 | Sorrentino et al. |
| 9,219,624 | B2 | 12/2015 | Gao et al. |
| 9,236,998 | B2 | 1/2016 | Wang et al. |
| 9,356,668 | B2 | 5/2016 | Zhang et al. |
| 9,386,465 | B2 | 7/2016 | Forenza et al. |
| 9,392,563 | B2 | 7/2016 | Guo et al. |
| 9,674,724 | B2 | 6/2017 | Kim et al. |
| 2011/0103271 | A1 | 5/2011 | Han et al. |
| 2012/0300864 | A1* | 11/2012 | Merlin ................. H04B 7/0617 375/260 |
| 2013/0089123 | A1 | 4/2013 | Rahul et al. |
| 2013/0343215 | A1 | 12/2013 | Li et al. |
| 2014/0160957 | A1 | 6/2014 | Zheng et al. |
| 2014/0362720 | A1 | 12/2014 | Kim et al. |
| 2015/0029874 | A1 | 1/2015 | Davydov et al. |
| 2015/0085690 | A1 | 3/2015 | Yi |
| 2015/0181546 | A1 | 6/2015 | Freda et al. |
| 2016/0301484 | A1 | 10/2016 | Zhu et al. |
| 2016/0308624 | A1 | 10/2016 | Rong et al. |
| 2017/0250740 | A1* | 8/2017 | Liang .................. H04B 7/0452 |
| 2018/0159670 | A1* | 6/2018 | Hsu ..................... H04L 5/0032 |

FOREIGN PATENT DOCUMENTS

| | | |
|---|---|---|
| EP | 3334224 A1 | 6/2018 |
| TW | 201110592 A | 3/2011 |
| TW | I519176 B | 1/2016 |
| WO | WO2014/048158 A1 | 4/2014 |
| WO | WO2014/121845 A1 | 8/2014 |

OTHER PUBLICATIONS

Lu et al., "An Overview of Massive MIMO: Benefits and Challenges," IEEE Journal of Selected Topics in Signal Processing, vol. 8, No. 5, Oct. 2014, pp. 742-758.
Panzner et al., "Deployment and implementation strategies for massive MIMO in 5G," 2014 IEEE Globecom Workshops, 2014, pp. 346-351.
Larsson et al., "Massive MIMO for next generation wireless systems," IEEE Communications Magazine, vol. 52, No. 2, Feb. 2014, pp. 186-195.
Perlman et al., "pCell Wireless Reinvented," Artemis White Paper, Feb. 2015, 99 pages.
Karakayali et al, "Network coordination for spectrally efficient communications in cellular systems," IEEE Wireless Communications, vol. 13, No. 4, Aug. 2006, pp. 56-61.
Kaltenberger et al., "Exploitationof Reciprocity in Measured MIMO Channels," Euro-Cost 2100 TD(09)950, Sep. 28-30, 2009, 7 pages.
Kaltenberger et al., "Relative channel reciprocity calibration in MIMO/TDD systems," 2010 Future Network & Mobile Summit, Florence, 2010, pp. 1-10.
Shepard et al., "Argos: Practical Many-Antenna Base Stations," MobiCom '12, Aug. 22-26, 2012, pp. 53-64.
Van de Beek et al, "ML estimation of time and frequency offset in OFDM systems," IEEE Transactions on Signal Processing, vol. 45, No. 7, , Jul. 1997, pp. 1800-1805.
S. H. Muller-Weinfurtner, "On the optimality of metrics for coarse frame synchronization in OFDM: a comparison," Ninth IEEE International Symposium on Personal, Indoor and Mobile Radio Communications, 1998, vol. 2, pp. 533-537.
Koivisto et al., "Impact of time and frequency offsets on cooperative multi-user MIMO-OFDM systems," 2009 IEEE 20th International Symposium on Personal, Indoor and Mobile Radio Communications, 2009, pp. 3119-3123.
Zarikoff et al., "Coordinated Multi-Cell Systems: Carrier Frequency Offset Estimation and Correction," IEEE Journal on Selected Areas in Communications, vol. 28, No. 9, Dec. 2010, pp. 1490-1501.

* cited by examiner

MULTI-ANTENNA SYSTEM AND PRECODING METHOD THEREOF

This application the benefit of Taiwan application Serial No. 106143618, filed Dec. 12, 2017, the disclosure of which is incorporated by reference herein in its entirety.

TECHNICAL FIELD

The disclosure relates to a multi-antenna system and a precoding method thereof.

BACKGROUND

Multi-antenna systems have been theoretically and practically proven to be capable of utilizing techniques such as precoding and/or beamforming to allow multiple users to access wireless resources and increase spectrum usage efficiency. Recently, it has been pointed out that if the number of antennas on the base station is more than four times the number of users, the spectrum usage efficiency will grow linearly with the increase of the number of users, which is called the massive antenna theory. In general, the number of base station antennas exceeding 64 can be called massive antenna. On the other hand, multiple base stations can be coordinated to jointly transmit data to the users to achieve performance equivalent to that of massive antenna. This is called a Multi-Cell Coordination (MCC) system. In the MCC system, all base stations are controlled by a coordination server. The best transmission mode can be selected according to the user conditions.

Since the clock sources of all the base stations in the MCC system are independent, there is a Carrier Frequency Offset (CFO) between the base stations. Other imperfections such as the sampling clock offset (SCO) caused by the CFO, the timing offset caused by the transmission delay, and the opposite linear phase in the downlink and uplink channels caused by the CFP, time-varying effects of RF response, etc., will result in inaccurate channel estimation. Inter-cell interference (ICI) and inter-user interference (IUI) may still occur after precoding, resulting in decreased system capacity. Therefore, proposing a multi-antenna system or a multi-base station system and a precoding method to solve the above problems is one of the issues the industry is currently focusing on.

SUMMARY

The disclosure relates to a multi-antenna system and a precoding method of the multi-antenna system, enabling coordination and synchronization in the multi-antenna system.

According to one embodiment, a precoding method in a multi-antenna system is provided. The precoding method includes the following steps. At least one reference device transmits a first reference signal to multiple base station antennas. At least one base station calculates multiple uplink channel information of the base station antennas according to the first reference signal, and transmits the uplink channel information to a coordination server. The coordination server calculates a carrier frequency offset between the base station antennas according to the uplink channel information. The at least one base station transmits a second reference signal to the at least one reference device. The at least one reference device calculates multiple downlink channel information of the base station antennas according to the second reference signal, and transmits the downlink channel information to the coordination server. The coordination server calculates a channel calibration coefficient according to the carrier frequency offset, the uplink channel information, and the downlink channel information. The coordination server calculates a first downlink channel of a user equipment at a first time point according to the channel calibration coefficient and a first uplink channel of the user equipment at the first time point. The coordination server uses a prediction function to predict a second downlink channel of the user equipment at a second time point according to the first downlink channel. The coordination server generates a precoder according to the second downlink channel.

According to another embodiment, a multi-antenna system is provided. The multi-antenna system includes at least one base station, at least one reference device, and a coordination server. The at least one base station includes multiple base station antennas. The at least one reference device wirelessly communicates with the base station antennas. The coordination server communicates with the at least one base station and the at least one reference device. The at least one reference device transmits a first reference signal to the base station antennas. The at least one base station calculates multiple uplink channel information of the base station antennas according to the first reference signal and transmits the uplink channel information to the coordination server. The coordination server calculates a carrier frequency offset between the base station antennas according to the uplink channel information. The at least one base station transmits a second reference signal to the at least one reference device. The at least one reference device calculates multiple downlink channel information of the base station antennas according to the second reference signal and transmits the downlink channel information to the coordination server. The coordination server calculates a channel calibration coefficient according to the carrier frequency offset, the uplink channel information, and the downlink channel information. The coordination server calculates a downlink channel of a user equipment at a first time point according to the channel calibration coefficient and a first uplink channel of the user equipment at the first time point. The coordination server uses a prediction function to predict a second downlink channel of the user equipment at a second time point according to the first downlink channel, and generates a precoder according to the second downlink channel.

According to still another embodiment, a precoding method used in a coordination server is provided. The precoding method includes the following steps. Receive multiple uplink channel information from multiple base station antennas. Calculate a carrier frequency offset between the base station antennas according to the uplink channel information. Receive multiple downlink channel information corresponding to the base station antennas from at least one reference device. Calculate a channel calibration coefficient according to the carrier frequency offset, the uplink channel information, and the downlink channel information. Calculate a first downlink channel of a user equipment at a first time point according to the channel calibration coefficient and a first uplink channel of the user equipment at the first time point. Use a prediction function to predict a second downlink channel of the user equipment at a second time point according to the first downlink channel. Generate a precoder according to the second downlink channel.

Figure 1:
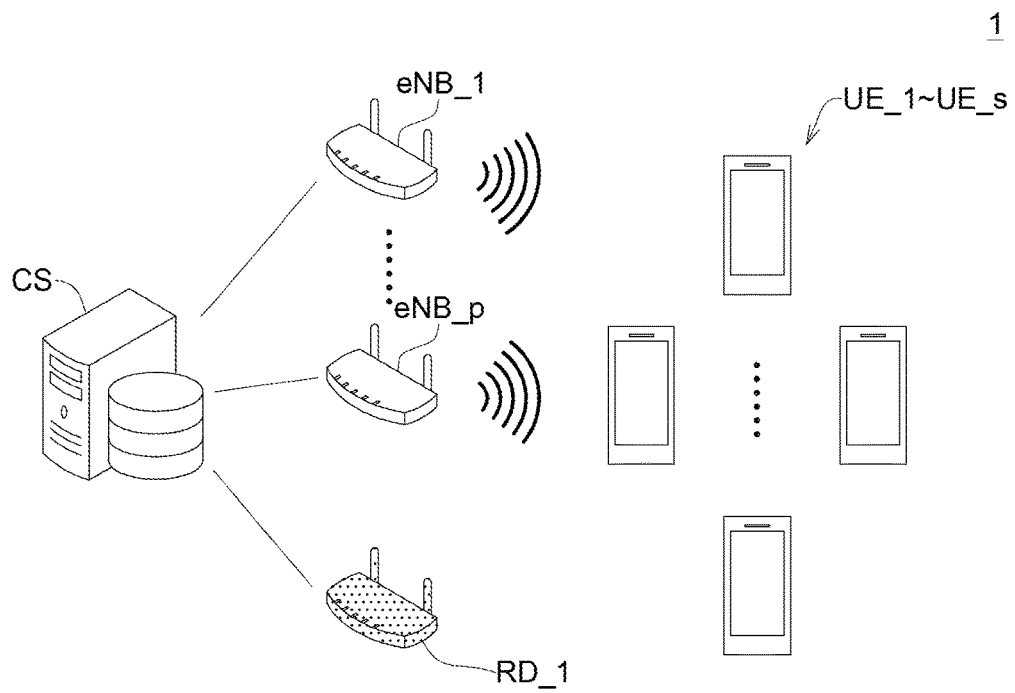
FIG. 1 shows a diagram of a multi-antenna system according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a diagram of a multi-antenna system according to one embodiment of the disclosure. In this embodiment, the multi-antenna system 1 includes multiple base stations eNB_1 to eNB_p, a reference device RD_1, and a coordination server CS, where p represents the number of base stations and p is an integer greater than 1. The base stations eNB_1 to eNB_p have multiple base station antennas, such as Nt base station antennas in total, where Nt is an integer greater than 1. Each base station may possess one or more base station antennas. The embodiment shown in FIG. 1 has multiple antennas, and may also be called a multi-base station system.

In this embodiment, an evolved Node B (eNB) in a Long Term Evolution (LTE) system is used as an example of the base stations eNB_1 to eNB_p. However, the multi-antenna system 1 is not limited to be used in the LTE system, but also may be applied to other types of wireless communication networks. The reference device RD_1 is, for example, a mobile device, a personal computer, an idle base station, or the like. The so-called unused base station, which is determined by the coordination server CS, refers to a base station that currently provides no service or the current loading is light. By taking the idle base station as a reference device, the available resources can be fully utilized for channel correction. If there are multiple idle base stations, the coordinating server CS may schedule to decide which idle base stations act as reference devices.

The reference device RD_1 may have one or more reference device antennas, such as Nr reference device antennas. Nr is an integer greater than or equal to 1. The base station eNB_1 to eNB_p may individually wirelessly communicate with the reference device RD_1. The base station eNB_1 to eNB_p and the reference device RD_1 may be communicatively connected to the coordinator server CS in wires. In other embodiments, the number of reference devices may also be multiple.

The multi-antenna system 1 may provide service to user equipments (UE) UE_1 to UE_s, where s is the number of user equipments, and s is an integer greater than or equal to 1. Each user equipment UE_1 to UE_s has one or more user equipment antenna, and may wirelessly communicate with the base stations eNB_1 to eNB_p.

In different embodiments, the base station may also select part of the base station antenna for transmission according to actual needs. That is, the number of base station antennas used by each base station for transmission may be smaller than the total number of base station antennas that base station has. For the sake of simplicity, the following description illustrates examples where the number of base station antennas used for transmission is equal to the total number of base station antennas, but the present invention is not limited thereto.

Figure 2:
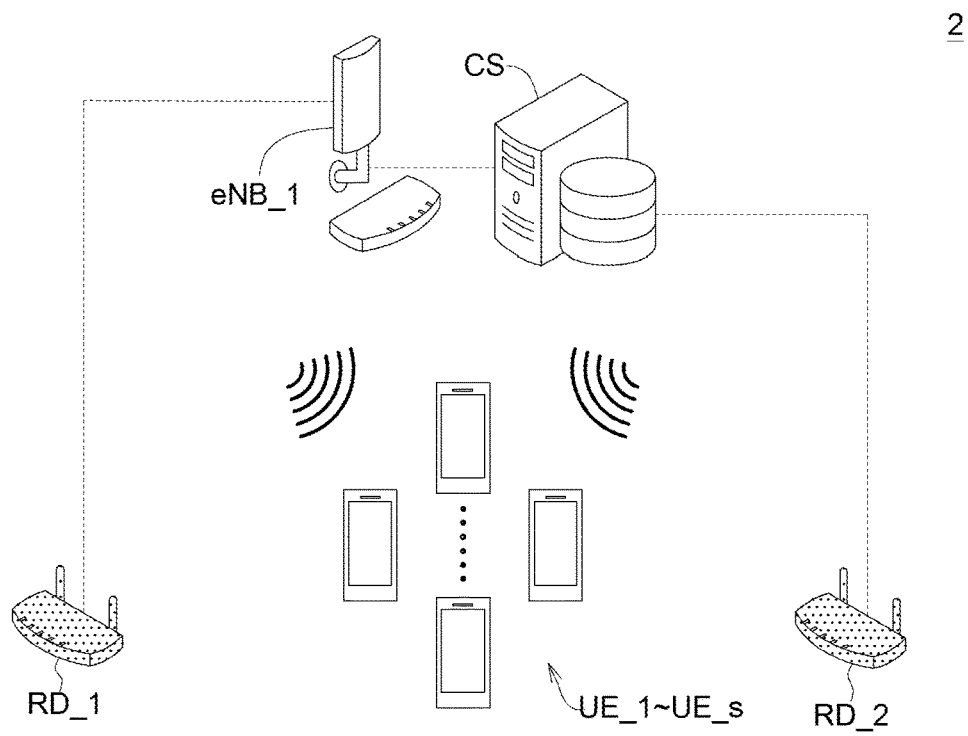
FIG. 2 shows a diagram of a multi-antenna system according to another embodiment of the disclosure.

FIG. 2 shows a diagram of a multi-antenna system according to another embodiment of the disclosure. This embodiment shows a single base station massive antenna system. The multi-antenna system 2 includes a single base station eNB_1, reference devices RD_1 to RD_2, and a coordination server CS. The single base station eNB_1 has multiple base station antennas, such as Nt base station antennas, where N is an integer greater than 1. The number of reference device antennas in each reference device RD_1 to RD_2 may be one or more. Although only two reference devices are depicted in this example, the multi-antenna system 2 may include three or more reference devices.

FIG. 1 and FIG. 2 shows two embodiments of the multi-antenna system. The number of base stations may be one or more, and the number of reference devices may be one or more. Without loss of generality, the multi-antenna system following description includes a coordination server CS, base stations eNB_1 to eNB_p, reference devices RD_1 to RD_q, and user equipments UE_1 to UE_s, where p, q, s are integers greater than or equal to 1. The one or more base stations eNB_1 to eNB_p has Nt base station antennas in total. The one or more reference devices RD_1 to RD_q has Nr reference device antennas in total. Each of the reference device RD_1 to RD_q and the base station eNB_1 to eNB_p has its own carrier frequency. For example, the reference device RD_r (r=1, 2, ... q) has a carrier frequency $\eta_r$, and the base station eNB_b (b=1, 2, ... p) has a carrier frequency $\varepsilon_b$.

Figure 3:
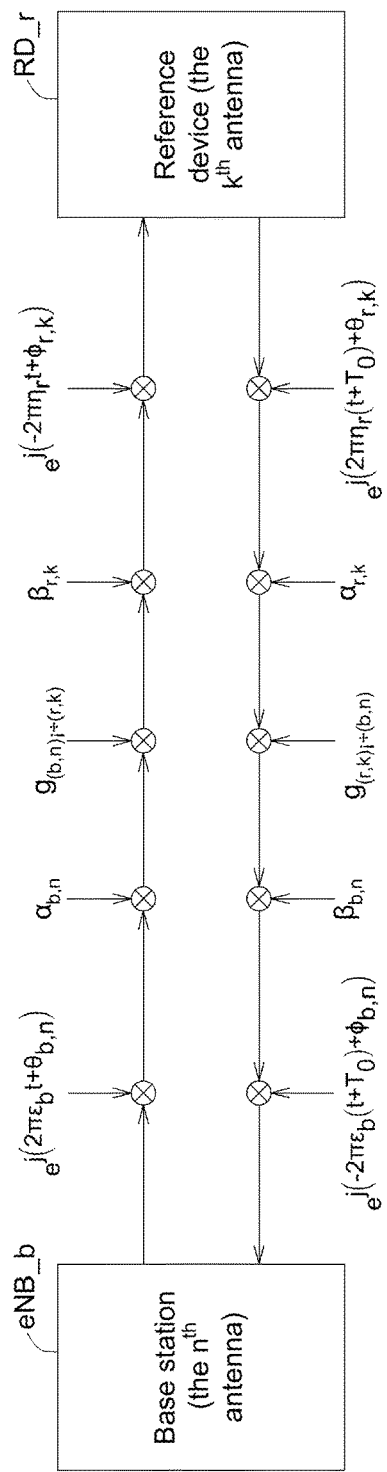
FIG. 3 shows a diagram of a link model according to one embodiment of the disclosure.

FIG. 3 shows a diagram of a link model according to one embodiment of the disclosure. In FIG. 3, the leftmost block represents the $n^{th}$ base station antenna (n=1, 2, ... Nt) of the base station eNB_b and the rightmost block represents the $k^{th}$ reference device antenna (k=1, 2, ... Nr) of the reference device RD_r. The upper arrow (directed from the $n^{th}$ antenna of the base station eNB_b to the $k^{th}$ antenna of the reference device RD_r) represents the downlink. The lower arrow (directed from the $k^{th}$ antenna of the reference device RD_r to the $n^{th}$ antenna of the base station eNB_b) represents the uplink. $\alpha$ represents radio frequency (RF) response of the transmitter, for example, $\alpha_{b,n}$ represents the RF response of the $n^{th}$ antenna of the base station eNB_b when the $n^{th}$ antenna of the base station eNB_b is the transmitter, and $\alpha_{r,k}$ represents the RF response of the $k^{th}$ antenna of the reference device RD_r when the $k^{th}$ antenna of the reference device RD_r is the transmitter. $\beta$ represents radio frequency (RF) response of the receiver, for example, $\beta_{b,n}$ represents the RF response of the $n^{th}$ antenna of the base station eNB_b when the $n^{th}$ antenna of the base station eNB_b is the receiver, and $\beta_{r,k}$ represents the RF response of the $k^{th}$ antenna of the reference device RD_r when the $k^{th}$ antenna of the reference device RD_r is the receiver. $g_{(b,n)\to(r,k)}$ and $g_{(r,k)\to(b,n)}$ represent the channels in the air. When the channels in the air have reciprocity property, $g_{(b,n)\to(r,k)}$ and $g_{(r,k)\to(b,n)}$ may be equivalent.

Figure 4:
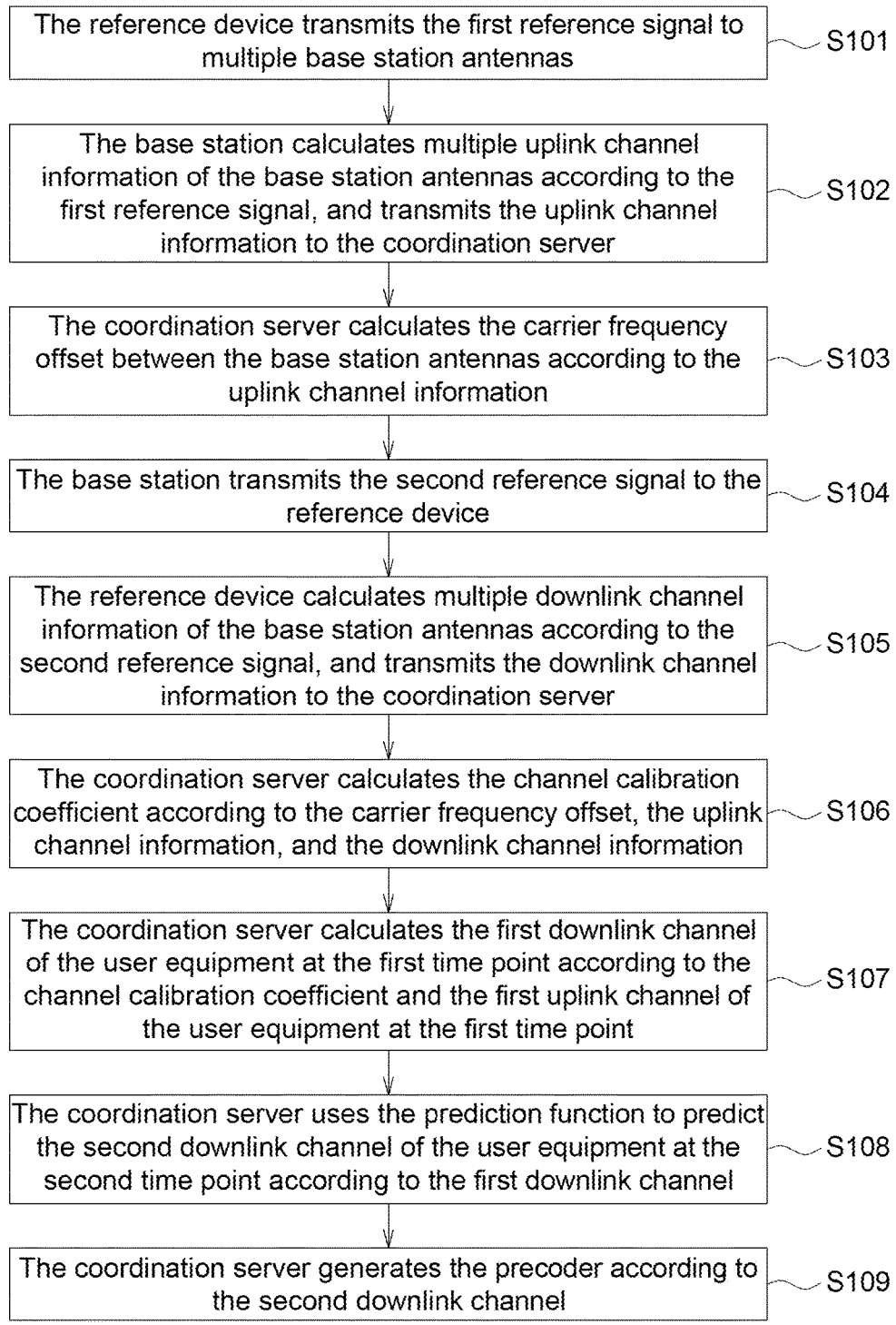
FIG. 4 shows a flowchart of a precoding method in a multi-antenna system according to one embodiment of the disclosure.

FIG. 4 shows a flowchart of a precoding method in a multi-antenna system according to one embodiment of the disclosure. The precoding method includes the following steps. Step S101: The reference device transmits a first reference signal to multiple base station antennas. Step S102: The base station calculates multiple uplink channel information of the base station antennas according to the first reference signal, and transmits the uplink channel information to a coordination server. Step S103: The coordination server calculates a carrier frequency offset between the base station antennas according to the uplink channel information. Step S104: The base station transmits a second reference signal to the at least one reference device. Step S105: The reference device calculates multiple downlink channel information of toe base station antennas according to the second reference signal, and transmits the downlink channel information to the coordination server. Step S106: The coordination sever calculates a channel calibration coefficient according to the carrier frequency offset, the uplink channel information, and the downlink channel information. Step S107: The coordination server calculates a first downlink channel of a user equipment at a first time point according to the channel calibration coefficient and a first uplink channel of the user equipment at the first time point. Step S108: The coordination server uses a prediction function to predict a second downlink channel of the user equipment at a second time point according to the first downlink channel. Step S109: The coordination server generates a precoder according to the second downlink channel. The precoding method shown in FIG. 4 may be applied to the multi-antenna system shown in FIG. 1 or FIG. 2 to perform precoding. Detailed description of each step is given below. For ease of explanation, the following description uses FIG. 1 as an example. However, the present invention is not limited thereto. The steps shown in FIG. 4 may also be applied to the multi-antenna system shown in FIG. 2. Also refer to FIG. 5A and FIG. 5B, which show diagrams of applying the steps in FIG. 4 to the multi-antenna system shown in FIG. 1.

Figure 5A:
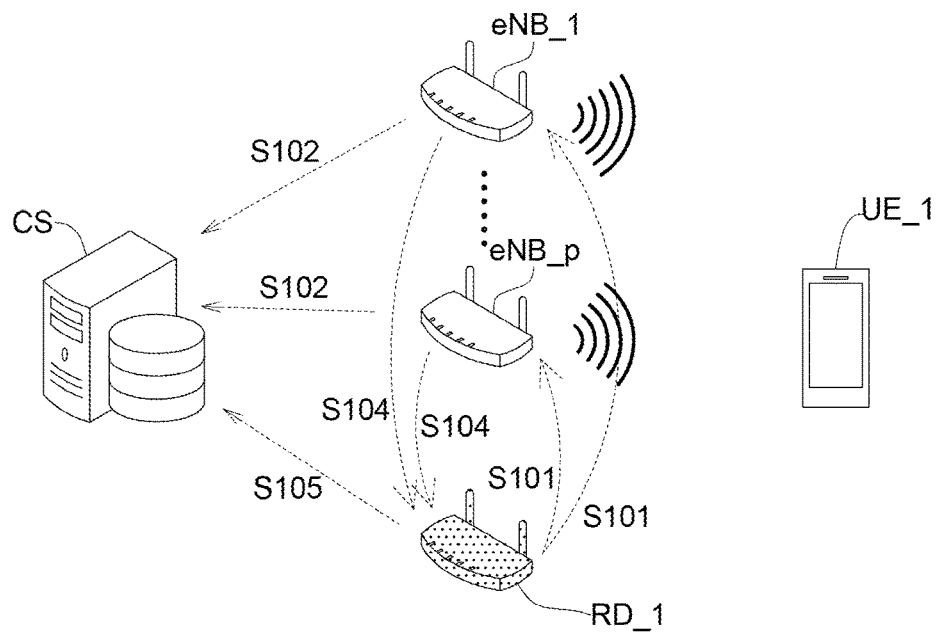
FIG. 5A and FIG. 5B show diagrams of applying the steps in FIG. 4 to the multi-antenna system shown in FIG. 1.
Figure 5B:
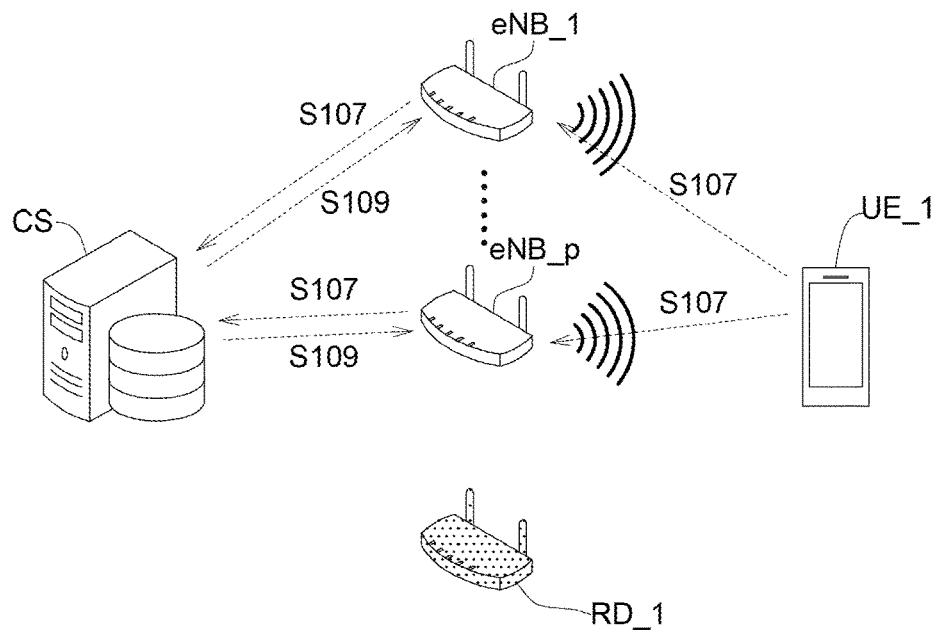

Step S101, the reference device RD_1 transmits the first reference signal to the base station, antennas of the base stations eNB_1 to eNB_p. The first reference signal is for example an uplink reference signal. As shown in FIG. 5A, the step S101 may include the reference device RD_1 transmitting the first reference signal to the base station eNB_1 and the base station eNB_p.

Refer to the link model shown in FIG. 3. When the reference device RD_r transmits the uplink reference signal the base station eNB_b, it may be affected by different initial phases due to the difference between the transmitting reference device antenna and the receiving base station antenna. For example, the uplink reference signal transmitted by the first reference device antenna of the reference device RD_r may be affected by the initial phase $\theta_{r,1}$ of the transmitter, the uplink reference signal transmitted by the second reference device antenna of the reference device RD_r may be affected by the initial phase $\theta_{r,2}$ of the transmitter, and so on. Similarly, the uplink reference signal received by the first base station antenna of the base station eNB_b may be affected by the initial phase $\phi_{b,1}$ of the receiver, the uplink reference signal received by the second base station antenna of the base station eNB_b may be affected by the initial phase $\phi_{b,2}$ of the receiver, and so on.

Step S102, the base station eNB_1 and the base station eNB_p may perform channel estimation according to the received first reference signal to calculate uplink channel information of the respective base station antennas. The base station eNB_1 and the base station eNB_p may respectively transmit the calculated uplink channel information to the coordination server CS. As shown in FIG. 5A, step S102 may include that the base station eNB_1 and the base station eNB_p transmit multiple uplink channel information to the coordination server CS.

For example, the base station eNB_1 may receive the uplink reference signals from the first reference device antenna to the Nr$^{th}$ reference device antenna of the reference device RD_1 (i.e., the uplink reference signal set ULRS_1_1), and also receive the uplink reference signals from the first reference device antenna to the Nr$^{th}$ reference device antenna of the reference device RD_2 (i.e., the uplink reference signal set ULRS_2_1), and so on. Then, the base station eNB_1 calculates the uplink channel information corresponding to each of the reference device antennas of the reference device RD_1 according to the uplink reference signal set ULRS_1_1, and calculates the uplink channel information corresponding to each of the reference device antennas of the reference device RD_2 according to the uplink reference signal set ULRS_2_1, and so on.

Based on the link model shown in FIG. 3, the base station eNB_b (b=1, 2, . . . p) calculates the uplink channel information $\hat{H}_{r \to b}(t)$ corresponding to the reference device RD_r (r=1, 2, . . . q) according to the uplink reference signal set ULRS_r_b. The uplink channel information $\hat{H}_{r \to b}(t)$ may be expressed as a complex matrix of dimensions Nt×Nr (that is, with Nt columns and Nr rows), where the element of the k$^{th}$ row and the n$^{th}$ column of $\hat{H}_{r \to b}(t)$ may be expressed as below:

$$h_{(r,k) \to (b,n)}(t) = \beta_{b,n} \cdot g_{(r,k) \to (b,n)} \cdot \alpha_{r,k} \cdot e^{j(-2\pi(\epsilon_b - \eta_r)t + \theta_{r,k} - \phi_{b,n})} + z_b(t),$$

where $z_b(t)$ is a term representing noise.

From the above formula, $\hat{H}_{r \to b}(t)$ is the uplink channel information observed by the base station eNB_b (which may be regarded as an uplink channel observed by the base station eNB_b). $\hat{H}_{r \to b}(t)$ is affected by the initial phase and the CFO (for example, the carrier frequency $\eta_r$ of the reference device RD_r is different from the carrier frequency $\epsilon_b$ of the base station eNB_b) and hence is different from the actual uplink channel. Therefore, $\hat{H}_{r \to b}(t)$ may be regarded as the actual uplink channel $H_{r \to b}(t)$ multiplied by a term consisting of the initial phases and the CFOs, and then added by the noise term.

Step S103, the coordination server CS calculates relative CFO of each base station eNB_1 to eNB_p according to the uplink channel information. The relative CFO refers to the difference of CFO between a reference base station and the other base stations. The reference base station is selected among the base stations eNB_1 to eNB_p. For example, assuming that the base station eNB_1 is selected as the reference base station, the difference of CFO between the base station eNB_2 and the base station eNB_1 is the relative CFO of the base station eNB_2, and so on.

Firstly, assuming that the base station eNB_1 is selected as the reference base station. A parameter matrix $G_{1b}(t)$ is defined as below:

$$G_{1b}(t) = \hat{H}_{r \to 1}^H(t) \hat{H}_{r \to b}(t) = H_{r \to 1}^H(t) H_{r \to b}(t) \cdot e^{j(2\pi(\epsilon_1 - \epsilon_b)t + \phi_1 - \phi_b)} + z_{1b}^c(t),$$

where $\hat{H}_{r \to 1}(t)$ is a matrix of the uplink channels from all the reference device antennas of the reference device RD_r to all the base station antennas of the base station eNB_1 (consisting of uplink channel information) calculated by the base station eNB_1; $\hat{H}_{r \to 1}^H(t)$ is a Hermitian matrix of $\hat{H}_{r \to 1}(t)$; $H_{r \to b}(t)$ is a matrix of the actual uplink channels from the reference device RD_r to the base station eNB_b; $H_{r \to 1}^H(t)$ is a Hermitian matrix of a matrix of the actual uplink channels from the reference device RD_r to the base station eNB_1; $z_{1b}^c(t)$ is a term representing noise.

Then, after a time period D, a parameter matrix $G_{1b}(t+D)$ may be derived as below:

$$G_{1b}(t+D) = H_{r \to 1}^H(t+D) H_{r \to b}(t+D) \cdot e^{j(2\pi(\varepsilon_1 - \varepsilon_b)t + 2\pi(\varepsilon_1 - \varepsilon_b)D + \phi_1 - \phi_b)} + z_{1b}^c(t+D).$$

Another parameter $R_{1b}(t,t+D)$ may be derived by performing complex conjugate multiplication on $G_{1b}(t)$ and $G_{1b}(t+D)$ as below:

$$R_{1b}(t, t+D) = G_{1b}^*(t) G_{1b}(t+D)$$
$$= H_{r \to 1}^H(t) H_{r \to b}(t) H_{r \to 1}^H(t+D) H_{r \to b}(t+D) \cdot e^{j2\pi(\varepsilon_1 - \varepsilon_b)D} + v(t, t+D),$$

where $v(t,t+D)$ is a term caused by the noise effect.

Without loss of generality, the uplink channel does not change much in the time period D (i.e., the change of the uplink channel may be ignored). Thus, $H_{r \to 1}^H(t+D)$ may be regarded as being equal to $H_{r \to 1}^H(t)$, and $H_{r \to b}(t+D)$ may be regarded as being equal to $H_{r \to b}(t)$. $R_{1b}(t,t+D)$ may be rewritten as below:

$$R_{1b}(t,t+D) = |H_{r \to 1}^H(t) H_{r \to b}(t)|^2 \cdot e^{j2\pi(\varepsilon_1 - \varepsilon_b)D} + v(t,t+D).$$

In an embodiment with multiple reference devices, after the coordination server CS completes the above calculation according to all the uplink channel information (corresponding to the reference devices RD_1 to RD_q) from the base station eNB_b, the coordination server CS combines all calculation results by weight combining, such as maximum ratio combining. The combined result is shown as below:

$$R_{1b}(t,t+D) = \sum_{r=1}^{q} |H_{r \to 1}^H(t) H_{r \to b}(t)|^2 \cdot e^{j2\pi(\varepsilon_1 - \varepsilon_b)D} + v(t,t+D).$$

From the above formula, the relative CFO of the base station eNB_b relative to the base station eNB_1 ($\varepsilon_1 - \varepsilon_b$) may be derived from the phase of $R_{1b}(t,t+D)$. In addition, $R_{1b}(t,t+D)$ derived by maximum ratio combining includes a first gain, i.e., $\sum_{r=1}^{q} |H_{r \to 1}^H(t) H_{r \to b}(t)|^2$, on the term $e^{j2\pi(\varepsilon_1 - \varepsilon_b)D}$ related to the relative CFO. When the quantity of the reference device RD_1 to RD_q is larger (that is, the value of q is larger), the first gain is larger, so that the ratio of the term with the first gain to $v(t,t+D)$ is larger. In other words, by weight combining (e.g., maximum ratio combining), the influence of noise may be reduced, and the accuracy of calculating the relative CFO may be increased. It should be noted that the combination manner illustrated above is merely an example, and the present disclosure is not limited thereto.

In addition to the maximum ratio combining described above, other weight combining methods may also be used, such as equal gain combining, switching combining, and selection combining.

After performing the calculation shown above, the relative CFO $\hat{\varepsilon}_{1b}$ of the base station eNB_b derived by the coordination server CS may be expressed as below:

$$\hat{\varepsilon}_{1b} = \varepsilon_1 - \varepsilon_b = \frac{1}{2\pi D} \angle (R_{1b}(t, t+D)),$$

where $\angle (R_{1b}(t,t+D))$ represents the phase of $R_{1b}(t,t+D)$.

It should be noted that $\hat{\varepsilon}_{1b}$ is a value derived by the base station eNB_b, and thus is an estimated value, which may be different from the actual value. The higher the accuracy of the estimation, $\hat{\varepsilon}_{1b}$ may be closer to the actual value.

It is understandable that the above description is taking the base station eNB_b as the example. In practice, the coordination server CS may calculate the relative CFOs corresponding to each of the base stations eNB_1 to eNB_p according to the above method based on the uplink channel information transmitted by each of the base stations eNB_1 to eNB_p respectively.

Step S104, each of the base stations eNB_1 to eNB_p transmits a downlink reference signal set DLRS_1_1 to DLRS_p_q to each of the reference devices RD_1 to RD_q respectively. For example, the base station eNB_1 transmits the downlink reference signal set DLRS_1_1 to DLRS_1_q to the reference device RD_1 to RD_q. That is, the base station eNB_1 transmits the downlink reference signal set DLRS_1_1 to the reference device RD_1, and transmits the downlink reference signal set DLRS_1_2 to the reference device RD_2, and so on.

Similar to the uplink reference signals, the downlink reference signals may be affected by the CFOs due to the difference of the transmitting base stations and the receiving, base stations. The downlink reference signal may also be affected by the initial phase of the base station antenna of the transmitting base station and the reference device antenna of the receiving reference device antenna.

Step S105, each of the reference devices RD_1 to RD_q calculates downlink channel information corresponding to each base station antenna of the base stations eNB_1 to eNB_p according to the downlink reference signal set DLRS_1_1 to DLRS_p_q respectively, and transmits the downlink channel information to the coordination server CS. For example, the reference device RD_1 may receive the downlink reference signal set DLRS_1_1 from the base station eNB_1, the downlink reference signal set DLRS_2_1 from the base station eNB_2, and so on. Then the reference device RD_1 may calculate the downlink channel information corresponding to each of the base station antennas of the base station eNB_1 according to the downlink reference signal set DLRS_1_1, the downlink channel information corresponding to each of the base station antennas of the base station eNB_2 according to the downlink reference signal set DLRS_2_1, and so on.

Based on the link model shown in FIG. 3, the downlink channel information $h_{(b,n) \to (r,k)}(t)$ of the channel from the $n^{th}$ antenna of the base station eNB_b to the $k^{th}$ antenna of the reference device RD_r may be expressed as below:

$$h_{(b,n) \to (r,k)}(t) = \beta_{r,k} \cdot g_{(b,n) \to (r,k)} \cdot \alpha_{b,n} \cdot e^{j(2\pi(\varepsilon_{1b} - \varepsilon_b - \eta_r)t + \theta_{b,n} + \phi_{r,k})},$$

where $\theta_{b,n}$ is the initial phase of the $n^{th}$ antenna of the base station eNB_b, and $\phi_{r,k}$ is the initial phase of the $k^{th}$ antenna of the reference device RD_r. It should be noted that without loss of generality, the noise item is omitted to simplify calculation and explanation.

Step S106, the coordination server CS calculates the channel calibration coefficient corresponding to each base station eNB_1 to eNB_p according to the CFO, the uplink channel information and the downlink channel information. At time $(t+T_0)$, the uplink channel information of the channel from the $k^{th}$ antenna of the reference device RD_r to the $n^{th}$ antenna of the base station eNB_b may be expressed as below:

$$h_{(r,k) \to (b,n)}(t+T_0) = \beta_{b,n} \cdot g_{(r,k) \to (b,n)} \cdot \alpha_{r,k} \cdot e^{j(-2\pi(\eta_r - \varepsilon_b + \varepsilon_{1b})(t+T_0) + \theta_{r,k} + \phi_{b,n})},$$

where $T_0$ is the time interval between transmitting the downlink reference signal and transmitting the uplink reference signal; $\theta_{r,k}$ is the initial phase of the $k^{th}$ antenna of the reference device RD_r; $\phi_{b,n}$ is the initial phase of the $n^{th}$ antenna of the base station eNB_b; $\hat{\varepsilon}_b$ is the CFO derived in the step S103.

In one embodiment, in the first time period D (t=0 to D), the coordination server CS calculates the first relative CFO as initial value. In the second time period D (t=D to 2D), the coordination server CS calculates the second relative CFO, and calculates the channel calibration coefficients according to the first relative CFO derived in the first time period D. In other words, the coordination server CS derives the channel calibration coefficients based on the previously derived relative CFO.

The channel calibration coefficient $c_{(b,n)\to(r,k)}(t+T_0)$ may be expressed as below:

$$c_{(b,n)\to(r,k)}(t+T_0) = \frac{h_{(b,n)\to(r,k)}(t)}{h_{(r,k)\to(b,n)}(t+T_0)}$$

$$= \frac{\frac{\alpha_{b,n}}{\beta_{b,n}}}{\frac{\alpha_{r,k}}{\beta_{r,k}}} e^{j(4\pi\hat{\varepsilon}_{1b}t + 2\pi(\eta_r - \varepsilon_b + \hat{\varepsilon}_{1b})T_0 + \theta_{b,n} + \phi_{r,k} - \theta_{r,k} - \phi_{b,n})}$$

Then normalization may be performed with respect to the first antenna of the base station eNB_1 and the first antenna of the reference device RD_r. The normalized channel calibration coefficient $c'_{(b,n)\to(r,k)}(t+T_0)$ may be expressed as follows:

$$c'_{(b,n)\to(r,k)}(t+T_0) = \frac{c_{(b,n)\to(r,k)}(t+T_0)}{c_{(1,1)\to(r,1)}(t+T_0)}$$

-continued $$= \frac{\frac{\alpha_{b,n}}{\beta_{b,n}} \frac{\alpha_{r,1}}{\beta_{r,1}}}{\frac{\alpha_{1,1}}{\beta_{1,1}} \frac{\alpha_{r,k}}{\beta_{r,k}}} e^{j(4\pi\hat{\varepsilon}_{1b}t + 2\pi(\varepsilon_1 - \varepsilon_b + \hat{\varepsilon}_{1b})T_0 + \tilde{\theta}_{(b,n)\to(r,k)})}$$

Step S107, each base station eNB_1 to eNB_p receives the uplink reference signal from the user equipments UE_1 to UE_s, and calculates the uplink channel information corresponding to each user equipment UE_1 to UE_s according to the uplink reference signal from each user equipment UE_1 to UE_s. Each base station eNB_1 to eNB_p transmits the calculated uplink channel information of the user equipment to the coordination server, which may be referred in FIG. 5B.

For a user equipment UE_u (u=1, 2, . . . , s), the coordination server CS derives a downlink channel information of the user device UE_u at the first time point $T_1$ $\hat{h}_{(b,n)\to(u,1)}(t+T_1)$ according to the uplink channel information of the user device UE_u at the first time point $T_1$ $h_{(u,1)\to(b,n)}(t+T_1)$ and the channel calibration coefficient $c'_{(b,n)\to(r,k)}(t+T_0)$ calculated ire the step S106. The downlink channel information $\hat{h}_{(b,n)\to(u,1)}(t+T_1)$ may be expressed as follows:

$$\hat{h}_{(b,n)\to(u,1)}(t+T_1) = c'_{(b,n)\to(r,k)}(t+T_0) h_{(u,1)\to(b,n)}(t+T_1)$$

$$= \hat{c}_{(b,n)\to(r,k)}(t+T_0) \cdot c^{-1}_{(b,n)\to(u,1)}(t+T_1) \cdot h_{(b,n)\to(u,1)}(t+T_1)$$

$$= \frac{h_{(u,1)\to(b,n)}(t+T_1)}{\hat{c}_{(r,k)\to(u,1)}(t+T_1)} e^{j(-2\pi(\varepsilon_b - \eta_u)T_1)}$$

where $\eta_u$ is the carrier frequency of the user equipment UE_u; and $\hat{c}_{(b,n)\to(r,k)}(t+T_0)$ is the channel calibration coefficient derived from the reference devices RD_1 to RD_q and the base stations eNB_1 to eNB_p. In other words, the coordination server CS derives the downlink channel information of the user equipment UE_u according to the channel calibration coefficient derived from the reference devices RD_1 to RD_q and the base stations eNB_1 to eNB_p.

The downlink channel information of all the user equipments UE_1 to UE_s may be expressed in a matrix as below:

$$\hat{H}(t+T_1) = \begin{bmatrix} c^{-1}_{(r,k)\to(u,1)}(t+T_1) & 0 & 0 \\ 0 & \ddots & 0 \\ 0 & 0 & c^{-1}_{(r,k)\to(N_u,1)}(t+T_1) \end{bmatrix}$$

$$\begin{bmatrix} e^{j(-2\pi(\varepsilon_1-\eta_1)T_1)} h_{b=1\to u=1}(t+T_1) & \cdots & e^{j(-2\pi(\varepsilon_{N_b}-\eta_1)T_1)} h_{b=N_b\to u=1}(t+T_1) \\ \vdots & \ddots & \vdots \\ e^{j(-2\pi(\varepsilon_1-\eta_{N_u})T_1)} h_{b=1\to u=N_u}(t+T_1) & \cdots & e^{j(-2\pi(\varepsilon_{N_b}-\eta_{N_u})T_1)} h_{b=N_b\to u=N_u}(t+T_1) \end{bmatrix} = C^{-1}_{(r,k)}(t+T_1) H^{CFO}(t+T_1).$$

where $h_{b\to u}$ is a channel vector from the base station eNB_b to the user equipment UE_u, $c_{(r,k)}^{-1}(t+T_1)$ is a matrix of channel calibration coefficients, and $H^{CFO}(t+T_1)$ is a matrix of CFO terms.

The coordination server CS may calculate a precoder or a precoding matrix according to the downlink channel information of the user equipments UE_1 to UE_s. For example, zero forcing method may be adopted for calculating the precoding matrix $F_{ZF}(t+T_1)$:

$$F_{ZF}(t+T_1) = \hat{H}^H(t+T_1)(\hat{H}(t+T_1)\hat{H}^H(t+T_1))^{-1}$$

However, the actual down downlink channel at the second time point $T_2$ is:

$$H(t+T_2) = \begin{bmatrix} e^{j(-2\pi(\varepsilon_1 - \eta_1)T_2)} h_{b=1 \to u=1}(t+T_2) & \cdots & e^{j(-2\pi(\varepsilon_{N_b} - \eta_1)T_2)} h_{b=N_b \to u=1}(t+T_2) \\ \vdots & \ddots & \vdots \\ e^{j(-2\pi(\varepsilon_1 - \eta_{N_u})T_2)} h_{b=1 \to u=N_u}(t+T_2) & \cdots & e^{j(-2\pi(\varepsilon_{N_b} - \eta_{N_u})T_2)} h_{b=N_b \to u=N_u}(t+T_2) \end{bmatrix}$$

Therefore, if the precoding matrix $F_{ZF}(t+T_1)$ thus calculated is used at the second time point $T_2$ for performing precoding, the precoding performance is likely to be not good.

As described above, the reference device may be used to solve the problems of synchronization between base stations, time-varying effects of radio frequency response, frequency selective fading channels, and acquisition of downlink channel information. However, the channel calibration coefficient has time-varying phase due to estimation errors. Moreover, the currently generated precoder is used in the channel at the next time point. That is, using the precoding matrix generated at the first time point $T_1$ at the second time point $T_2$ may result in poor precoding effect due to the time-varying nature of the channel (for example, the phase may change with time), so that the system performance may be degraded.

Step S108, the coordination server CS uses the prediction function $p_b(t+T_2)$ to predict the second downlink channel of the user equipment at the second time point $T_2$, predict the time varying phase of the channel calibration coefficient at the second time point $T_2$, so as to obtain a more accurate downlink channel information to enhance the precoding performance.

Based on the prediction function $p_b(t+T_2)$, the equivalent downlink channel of a user equipment at the second time point $T_2$ may be expressed as:

$$\hat{h}_{(b,n) \to (u,1)}(t+T_1) = p_b(t+T_2) \cdot c'_{(b,n) \to (r,k)}(t+T_0) \cdot h_{(u,1) \to (b,n)}(t+T_1)$$

In matrix form:

$$\tilde{H}(t+T_2) = P_b(t+T_2) C_{(r,k)}^{-1}(t+T_1) H^{CFO}(t+T_1)$$

In one embodiment, the coordination server CS may calculate multiple reference downlink channels of the user equipment at multiple reference time points according to the channel correction coefficient and multiple reference uplink channels of the user equipment at multiple reference time points. The calculation may be referred to the above description. Then the coordination server CS may generate the prediction function based on these reference downlink channels. For example, the coordinating server may be configured to store multiple user equipment equivalent downlink channel values calculated at multiple past time points, then calculate a prediction trend according to the stored equivalent downlink channel values at these past time points, and then generate the prediction function.

The prediction function used in this invention is not limited to particular forms. Several embodiments regarding the prediction function are listed below. In one embodiment, the prediction function is a polynomial function. The coordination server CS performs polynomial regression analysis according to multiple reference time points and multiple reference downlink channels to find a fitting polynomial as the prediction function. For example, the prediction function may be represented as $p_b(t) = q_0 + q_1 t + q_2 t^2 + \ldots + q_n t^n$. Time is taken as an independent variable, and user equipment equivalent downlink channel is taken as a dependent variable. Regression analysis, such as ordinary least square estimation, method of moment, and maximum likelihood estimation, may be performed according to multiple estimated equivalent downlink channels $\hat{h}_{(b,n) \to (u,1)}$ to obtain the best coefficients $q_0, q_1, \ldots q_n$.

In another embodiment, the coordination server CS may calculate a weighted average of multiple reference downlink channels $\hat{h}_{(b,n) \to (u,1)}$, and generates the prediction function according to a phase information of the weighted average. This method may be called smoothing algorithm. The phase of the prediction function may be expressed as:

$$\measuredangle p_b(t) = \measuredangle \frac{1}{M} \sum_{m=1}^{M} q_m \hat{h}_{(b,n) \to (u,1)},$$

where $q_m$ represents the weight of each reference downlink channel when calculating the weighted average. In this approach M reference downlink channels are used. For example, this approach is to calculate the arithmetic mean of multiple reference downlink channels when each reference downlink channel uses the same weight $q_m$. In one implementation the reference downlink channel closer to the current time may be assigned a higher weight, and the reference downlink channel farther away from the current time may be assigned a lower weight, so as to predict the possible phase change at the future time points according to the phase change at the latest time points.

Step S109, the coordination server CS generates the precoder according to the second downlink channel. For example, the precoding matrix may be calculated by zero forcing method, and, the precoding matrix may be expressed as:

$$\tilde{F}_{ZF}(t+T_2) = \tilde{H}^H(t+T_2)(\tilde{H}(t+T_2)\tilde{H}^H(t+T_2))^{-1}$$

The new equivalent downlink channel matrix after precoding may be expressed as:

$$H_{eq}(t+T_2) = H(t+T_2)\tilde{F}_{ZF}(t+T_2) \in C^{N_u \times N_u}$$

The coordination server CS may transmit the calculated precoding matrix to the base stations eNB_1 to eNB_p in the step S109. Because the precoding matrix includes information related to relative CFO of each base station eNB_1 to eNB_p and the of channel calibration coefficient, the base stations eNB_1 to eNB_p are able to use the precoding matrix to calibrate the channel when performing downlink transmission to the user equipments UE_1 to UE_s. Consequently, the cooperation between the base stations eNB_1 to eNB_p is synchronized better, and thus better service quality can be provided to the user equipments UE_1 to UE_s.

Figure 6:
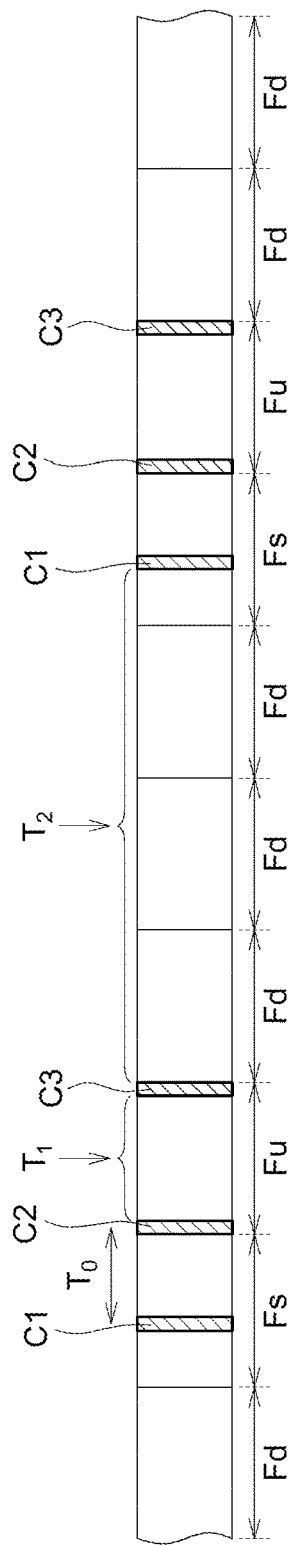
FIG. 6 shows a timing diagram of transmission of the reference signal according to one embodiment of the disclosure.

FIG. 6 shows a timing diagram of transmission of the reference signal according to one embodiment of the disclosure. In this embodiment, the downlink reference signal (the second reference signal transmitted from the base station to the reference device) is scheduled in the period C1. The downlink reference signal is transmitted in a special sub-frame Fs, which is between an uplink period sub-frame Fu and a downlink period sub-frame Fd. In particular, the downlink reference signal is configured to be transmitted in a guard period in the special sub-frame Fs. Then the reference devices RD_1 to RD_q calculate the downlink channel information and transmit the downlink channel information to the coordination server CS. This step is for example corresponding to the step S105 in FIG. 4.

The uplink reference signal (the first reference signal transmitted from the reference device to the base station) is scheduled in the period C2. The uplink reference signal is transmitted in the uplink sub-frame Fu. Then the base stations eNB_1 to eNB_q calculate the uplink channel information and transmit the uplink channel information to the coordination server CS. This step is for example corresponding to the step S102 in FIG. 4. Take the LTE system as an example, the uplink reference signal may be configured to be transmitted in the uplink pilot time slot (UpPTS) in the uplink time.

The uplink channel signal, of the user equipment is scheduled in the period C3. The base station eNB_1 to eNB_p calculate the uplink channel information of, the user equipment UE_1 to UE_s and transmit the uplink channel information to the coordination server CS. This step is for example corresponding to the step S107 in FIG. 4. The period C3 may be scheduled in an uplink sub-frame close to the next downlink sub-frame. After performing the step S108 and S109, the base stations eNB_1 to eNB_p obtain the precoding matrix from the coordination server CS, and use the precoding matrix in the multiple following downlink sub-frames Fd to serve the user equipments UE_1 to UE_s.

Figure 7:
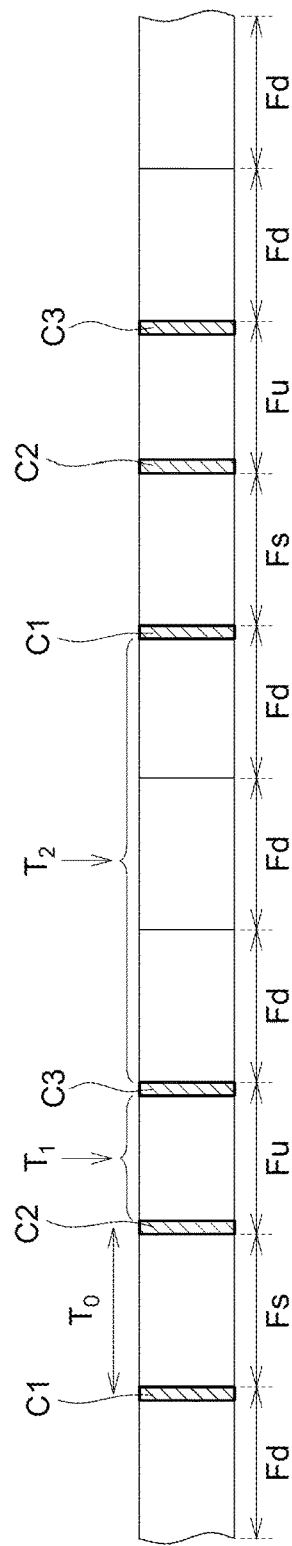
FIG. 7 shows a timing diagram of transmission of the reference signal according to another embodiment of the disclosure.

FIG. 7 shows a timing diagram of transmission of the reference signal according to another embodiment of the disclosure. The difference between this embodiment and the embodiment in FIG. 6 is that the downlink reference signal is scheduled in the period C1, which is in the downlink sub-frame Fd. Then the reference devices RD_1 to RD_q calculate the downlink channel information and transmit the downlink channel information to the coordination server CS.

The uplink reference signal is scheduled in the uplink sub-frame Fu (the period C2), which is the same as the embodiment shown in FIG. 6. Then the base stations eNB_1 to eNB_q calculate the uplink channel information and transmit the uplink channel information to the coordination server CS. After the base stations eNB_1 to eNB_p calculate the uplink channel information of the user equipment UE_1 to UE_s and transmit the uplink channel information to the coordination server CS (the period C3), the base stations eNB_1 to eNB_p obtain the precoding matrix from the coordination server CS, and use the precoding matrix in the multiple following downlink sub-frames Fd to serve the user equipments UE_1 to UE_s.

The time $T_0$ is for example the time difference between the first reference signal and the second reference signal, that is, the time difference between the period C1 and the period C2. The first time point $T_1$ in the precoding method in FIG. 4 is for example a time point between the period C2 and the period C3. That is, a time point at which the coordination server CS calculates the channel calibration coefficient after the period C1 and the period C2 end. The second time point $T_2$ is for example after the period C3. That is, after receiving the uplink channel information from the user equipments, the coordination server CS predicts the equivalent downlink channel at the second time point $T_2$ to generate the precoding matrix accordingly.

In addition, the uplink reference signal and the downlink reference signal may be designed based on the needs to enable the base stations eNB_1 to eNB_p to identify the transmission source of the uplink reference signal (from, which reference device/reference device antenna), and also to enable the reference devices RD_1 to RD_q to identify the transmission source of the downlink reference signal (from, which base station/base station antenna). In an embodiment, the reference device antennas of the reference devices RD_1 to RD_q may transmit the uplink reference signals by using sub-carriers having different frequencies. For example, the first reference device antenna of the reference device RD_1 transmits the uplink reference signal by using a sub-carrier having a first frequency, the second reference device antenna of the reference device RD_1 transmits the uplink reference signal by using a sub-carrier having a second frequency, and so on. Alternatively, the reference device antennas of the different reference devices may transmit the uplink reference signals by using sub-carriers with different frequencies. In another embodiment, the reference device antennas of the reference devices RD_1 to RD_q may transmit the uplink reference signals encoded by different orthogonal codes. For example, the first reference device antenna of the reference device RD_1 transmits the uplink reference signal by using a first orthogonal coding, the second reference device antenna of the reference device RD_1 transmits the uplink reference signal by using a second orthogonal coding, and so on. Alternatively, the reference device antennas of the different reference devices may transmit the uplink reference signals by using different orthogonal coding.

Similarly, the base station antennas of the base stations eNB_1 to eNB_p may transmit the downlink reference signals by using sub-carriers having different frequencies. Alternatively, the base station antennas of the different base stations may transmit the downlink reference signals by using sub-carriers having different frequencies. In another embodiment, the base station antennas of the base stations eNB_1 to eNB_p may transmit the downlink reference signals encoded by different orthogonal codes. Alternatively, the base station antenna of the different base stations may transmit the downlink reference signals encoded by different orthogonal codes.

In addition, in other embodiments, the uplink reference signal and/or the downlink reference signal may be scheduled in a sub-carrier of a guard band for transmission.

The multi-antenna system and the precoding method proposed in this disclosure can be applied to a system using LTE protocol, a system using Wi-Fi communication protocol (for example, a wireless access point may be used as a base station), or other Time-Division Duplexing (TDD) systems.

The multi-antenna system and the precoding method according to the embodiments given above can solve the problems of coordination and synchronization between base stations in the multi-antenna system, time-varying effects of radio frequency response, and acquisition of downlink channel status information. Not only the impact caused by the carrier frequency offset during multi-base station cooperation is reduced, but also the problem of inaccurate channel calibration caused by frequency selective fading can be solved. Therefore the problem of system performance degradation caused by the time-varying channels can be solved.

Further, by adding a reference device to the multi-antenna system, the relative carrier frequency offset between multiple base stations can be estimated by using the uplink reference signal and compensated, effectively solving the problem of synchronization between multiple base stations. The reference device tracks the time-varying effect of the radio frequency response in real-time by the received downlink reference signal to obtain the channel calibration coefficient. Moreover, a prediction function can be used to take the time-varying channel into consideration to predict the user equipment equivalent downlink channel at future time points, effectively achieving a more accurate precoding result. In addition, as the number of reference device antennas increases, the effect of frequency selective fading can be further reduced.

That various modifications and variations may be made to the disclosed embodiments. It is intended that the specification and examples be considered as exemplary only, with a true scope of the disclosure being indicated by the following claims and their equivalents.

What is claimed is:

1. A precoding method in a multi-antenna system, the method comprising:
    transmitting, by at least one reference device, a first reference signal to a plurality of base station antennas;
    calculating, by at least one base station, a plurality of uplink channel information of the base station antennas according to the first reference signal, and transmitting the uplink channel information to a coordination server;
    calculating, by the coordination server, a carrier frequency offset between the base station antennas according to the uplink channel information;
    transmitting, by the at least one base station, a second reference signal to the at least one reference device;
    calculating, by the at least one reference device a plurality of downlink channel information of the base station antennas according to the second reference signal, and transmitting the downlink channel information to the coordination server;
    calculating, by the coordination server, a channel calibration coefficient according to the carrier frequency offset, the uplink channel information, and the downlink channel information;
    calculating, by the coordination server, a first downlink channel of a user equipment at a first time point according to the channel calibration coefficient and a first uplink channel of the user equipment at the first time point;
    using, by the coordination server, a prediction function to predict a second downlink channel of the user equipment at a second time point according to the first downlink channel; and
    generating, by the coordination server, a precoder according to the second downlink channel.

2. The precoding method according to claim 1, further comprising:
    calculating, by the coordination server, a plurality of reference downlink channels of the user equipment at a plurality of reference time points according to the channel calibration coefficient and a plurality of reference uplink channels of the user equipment at the reference time points; and
    generating, by the coordination server, the prediction function according to the reference downlink channels.

3. The precoding method according to claim 2, wherein the step of generating the prediction function comprises:
    performing, by the coordination server, polynomial regression analysis according to the reference time points and the reference downlink channels to find a fitting polynomial as the prediction function.

4. The precoding method according to claim 2, wherein the step of generating the prediction function comprises:
    calculating, by the coordination server, a weighted average of the reference downlink channels, and generating the prediction function according to a phase information of the weighted average.

5. The precoding method according to claim 1, wherein the first reference signal is scheduled in an uplink period sub-frame.

6. The precoding method according to claim 1, wherein the second reference signal is scheduled in a downlink period sub-frame or a guard period between an uplink period sub-frame and the downlink period sub-frame.

7. The precoding method according to claim 1, wherein the base station antennas transmit the second reference signals by using sub-carriers having different frequencies.

8. The precoding method according to claim 1, wherein the base station antennas transmit the second reference signals encoded by different orthogonal codes.

9. A multi-antenna system, comprising:
    at least one base station, comprising a plurality of base station antennas;
    at least one reference device, wirelessly communicating with the base station antennas; and
    a coordination server, communicating with the at least one base station and the at least one reference device;
    wherein the at least one reference device transmits a first reference signal to the base station antennas, the at least one base station calculates a plurality of uplink channel information of the base station antennas according to the first reference signal and transmits the uplink channel information to the coordination server, the coordination server calculates a carrier frequency offset between the base station antennas according to the uplink channel information;
    wherein the at least one base station transmits a second reference signal to the at least one reference device, the at least one reference device calculates a plurality of downlink channel information of the base station antennas according to the second reference signal and transmits the downlink channel information to the coordination server, the coordination server calculates a channel calibration coefficient according to the carrier frequency offset, the uplink channel information, and the downlink channel information;
    wherein the coordination server calculates a first downlink channel of a user equipment at a first time point according to the channel calibration coefficient and a first uplink channel of the user equipment at the first time point, uses a prediction function to predict a second downlink channel of the user equipment at a second time point according to the first downlink channel, and generates a precoder according to the second downlink channel.

10. The multi-antenna system according to claim 9, wherein the coordination server calculates a plurality of reference downlink channels of the user equipment at a plurality of reference time points according to the channel calibration coefficient and a plurality of reference uplink channels of the user equipment at the reference time points, and the coordination server generates the prediction function according to the reference downlink channels.

11. The multi-antenna system according to claim 10, wherein the coordination server performs polynomial regression analysis according to the reference time points and the reference downlink channels to find a fitting polynomial as the prediction function.

12. The multi-antenna system according to claim 10, wherein the coordination server calculates a weighted average of the reference downlink channels, and generates the prediction function according to a phase information of the weighted average.

13. The multi-antenna system according to claim 9, wherein the first reference signal is scheduled in an uplink period sub-frame.

14. The multi-antenna system according to claim 9, wherein the second reference signal is scheduled in a downlink period sub-frame or a guard period between an uplink period sub-frame and the downlink period sub-frame.

15. The multi-antenna system according to claim 9, wherein the base station antennas transmit the second reference signals by using sub-carriers having different frequencies.

16. The multi-antenna system according to claim 9, wherein the base station antennas transmit the second reference signals encoded by different orthogonal codes.

17. A precoding method used in a coordination server, comprising:
receiving a plurality of uplink channel information from a plurality of base station antennas;
calculating a carrier frequency offset between the base station antennas according to the uplink channel information;
receiving a plurality of downlink channel information corresponding to the base station antennas from at least one reference device;
calculating a channel calibration coefficient according to the carrier frequency offset, the uplink channel information, and the downlink channel information;
calculating a first downlink channel of a user equipment at a first time point according to the channel calibration coefficient and a first uplink channel of the user equipment at the first time point;
using a prediction function to predict a second downlink channel of the user equipment at a second time point according to the first downlink channel; and
generating a precoder according to the second downlink channel.

18. The precoding method according claim 17, further comprising:
calculating a plurality of reference downlink channels of the user equipment at a plurality of reference time points according to the channel calibration coefficient and a plurality of reference uplink channels of the user equipment at the reference time points; and
generating the prediction function according to the reference downlink channels.

19. The precoding method according to claim 18, wherein the step of generating the prediction function comprises:
performing polynomial regression analysis according to the reference time points and the reference downlink channels to find a fitting polynomial as the prediction function.

20. The precoding method according to claim 18, wherein the step of generating the prediction function comprises:
calculating a weighted average of the reference downlink channels, and generating the prediction function according to a phase information of the weighted average.

* * * * *